United States Patent [19]

Schmidt

[11] Patent Number: 5,259,066
[45] Date of Patent: Nov. 2, 1993

[54] ASSOCIATIVE PROGRAM CONTROL

[76] Inventor: Richard Q. Schmidt, 290 Bay Ave., Huntington, N.Y. 11743

[21] Appl. No.: 510,212

[22] Filed: Apr. 16, 1990

[51] Int. Cl.$^5$ ............................................ G06F 15/18
[52] U.S. Cl. ...................................... 395/54; 365/49; 395/50; 395/60
[58] Field of Search ................... 395/1, 54, 10; 365/49

[56] References Cited

U.S. PATENT DOCUMENTS

| | | | |
|---|---|---|---|
| 4,697,242 | 9/1987 | Holland et al. | 364/513 |
| 4,748,439 | 5/1988 | Robinson et al. | 340/146.2 |
| 4,852,059 | 7/1989 | Oates | 365/49 |
| 4,901,229 | 2/1990 | Tashiro et al. | 364/200 |
| 5,107,501 | 4/1992 | Zorian | 371/213 |

OTHER PUBLICATIONS

Chisvin et al., "Content-Addressable and Associative Memory: Alternatives to the Ubiquitous RAM", IEEE Computer, Jul. 1989, 51–64.
Ogura et al., "A 20 Kb CMOS Associative Memory LSI for Artificial Intelligence Machines", Proc. IEEE Intl. Conf. Computer Design: VLSI in Computers, 1986, 574–577.
Kogge et al., "VLSI and Rule-Based Systems", from VLSI for Artificial Intelligence, 1989, 95–108.

*Primary Examiner*—Michael R. Fleming
*Assistant Examiner*—Robert W. Downs

[57] ABSTRACT

Methods and an arrangement providing improved expert system performance. A mathematically based method is used in building a rule base that guarantees a complete and consistent rule set, providing an aid for identifying missing rules. The method is used in recognizing input variable patterns in parallel to provide rapid inferencing. An arrangement based on the method is given for a content addressable memory capable of returning an address of an executable routine for each rule of a rule set given the system state variables. The method is employed to provide associative program control, in which program control flow adapts to changing system state variables. A method is described for associative database management, using the new content addressable memory arrangement.

22 Claims, 10 Drawing Sheets

If salary > $15,000

AND credit is good  ~32

AND has references

THEN grant loan

| Rule | sal > 15K | credit | ref. | | | |
|------|-----------|--------|------|---|---|---|
| 1 | 0 | e | e | e | e | no grant A |
| 2 | e | 0 | e | e | e | no grant B |
| 3 | e | e | 0 | e | e | no grant C |
| 4 | 1 | 1 | 1 | e | e | grant |

FIG. 3

| Rule | sal > 15K | credit ref. | | | | |
|------|-----------|-------------|---|---|---|---|
| 1    | 0         | e           | e | e | e | no grant A |
| 2    | e         | 0           | e | e | e | no grant B |
| 3    | e         | e           | 0 | e | e | no grant C |
| 4    | 1         | 1           | 1 | e | e | grant |

51

| Rule | sal > 15K | credit ref. | | | | |
|------|-----------|-------------|---|---|---|---|
| 1    | 0         | e           | e | e | e | no grant A |
| 2    | 1         | 0           | e | e | e | no grant B |
| 3    | 1         | 1           | 0 | e | e | no grant C |
| 4    | 1         | 1           | 1 | e | e | grant |

Left table (61): $2^5 + 2^4 + 2^2 > 2^5$ extra states

Columns labeled (top): $2^4$, $2^4$, $2$, $2^2$ — braced as $2^5$

| 63 | 64 | 65 | 66 |
|---|---|---|---|
| 0 | θ | θ | 1 |
| θ | 0 | θ | 1 |
| θ | θ | 0 | 1 |
| θ | θ | θ | θ |
| θ | θ | θ | θ |

Right table (62): $2^5$ = Complete Domain

Columns labeled (top): $2^3$, $2^3$ (braced as $2^4$); $2^2$, $2^2$ (braced as $2^4$); together $2^5$ Rows: 611, 612, 613, 614, 615

| 67 | 68 | 69 | 610 |
|---|---|---|---|
| 0 | 1 | 1 | 1 |
| θ | 0 | 1 | 1 |
| θ | θ | 0 | 1 |
| θ | θ | θ | θ |
| θ | θ | θ | θ |

Consistent set if no two rules are the same in every column.

| | | | | | | |
|---|---|---|---|---|---|---|
| 1 | 0 | 0 | 0 | 0 | 0 | rule ~71 |
| | 1 | 0 | 0 | 0 | 0 | mask ~72 |
| 2 | 1 | 0 | 0 | 0 | 0 | ~73 |
| | 1 | 1 | 0 | 0 | 0 | |
| 3 | 1 | 1 | 0 | 0 | 0 | ~74 |
| | 1 | 1 | 1 | 0 | 0 | |
| 4 | 1 | 1 | 1 | 0 | 0 | ~75 |
| | 1 | 1 | 1 | 0 | 0 | |

Fire if: mask • input - rule = zero.

ASSOCIATIVE PROGRAM CONTROL

BACKGROUND OF THE INVENTION

Expert systems are computer programs that provide the skill of an expert in a defined area of expertise. Rule based expert systems capture the skill of an expert by expressing the expertise as a series of rules. The rules are expressed as if-then statements involving symbolic variables. For example, "If conditions (A and B and C) or (B and D and not E) are true, then F is true." makes a logical inference about symbolic variable F based on the program's knowledge of the states of variables A through E. The variables take on the values of true or false and Boolean algebraic rules of logic are used to evaluate the statement. The "then" part of the statement performs an action based on the outcome of the evaluation of the "if" part. In this example, F is set "true" if either set of conditions in parentheses evaluates to "true". Otherwise F is set "false".

In the example, if the expert system was designed to provide intelligent decisions on granting a loan to an individual, F might represent the final decision to grant the loan if true, or deny the loan if false. Other rules could have set A "true" if the individual's income is greater than a given percentage of the loan. B could have been set "true" or "false" depending on a credit search. Thus expert decisions are represented by facts pertinent to the decision and logical rules to interpret the facts. Expert systems have demonstrated their success in such diverse fields as medicine, oil exploration, and finance.

The generation of expert systems has been faced with the difficult task of extracting the rules of expertise from experts, who often find it difficult to express their expertise in such a formal manner. A scientific methodology for developing complete and consistent rule sets has not been in the public domain. System developers have relied on the empirical method of testing the systems and extracting new rules from the expert by presenting him with sets of conditions that elicit incorrect responses from the expert system. It is thus not uncommon to have systems function well for a long period of time and then suddenly fail when a previously unencountered condition occurs.

Another problem faced by expert system designers is the relatively slow speed with which inferences can be drawn. Even though computer speeds have increased dramatically, as more knowledge is built into expert systems, the number of potential decision paths increases exponentially and overpowers the computer improvement. This is known as the combinatorial explosion in which the number of possible outcomes for N variables is equal to 2 raised to the Nth power. The serial nature of most computers and the lack of a viable method to process inferences in a parallel manner efficiently have hampered obtaining a satisfactory solution to this problem.

The problem is akin to maintaining a database for rapid retrieval of information. A directory of keywords can be used to point to the location of randomly stored data. As keywords are added to and deleted from the directory over the lifespan of the database, they have to be inserted in a sorted order, to enable more rapid access. This entails time consuming computational effort. The retrieval then requires a search of the directory to find the keyword which is also time consuming. To reduce the time, hashing methods have been employed. However, hashing takes time and runs into difficulty as the stored data nears the capacity of the storage area.

SUMMARY OF THE INVENTION

It is an object of the present invention to overcome the prior art disadvantages. In particular, it is the object of the present invention to provide a method and arrangements for building complete, consistent rule sets that provide rapid inferences.

In keeping with this object and with still others which will become apparent as the description proceeds, the important characteristics of the invention are: a mathematically based method of building a rule base, a method and arrangements for parallel association of variables, a method of providing associative program control, and a method for providing associative database management.

The present invention is comprised as follows: a method of representing inference rules as binary words in which each bit represents a symbolic variable. This enables the parallel comparison of several variables at a time, which provides reduced through-put time. An inference is drawn when the system state, represented by the symbolic variables, matches a predetermined pattern. The inference is generally used to initiate an action, which may include the setting of the states of one or more of the symbolic variables. These shall be referred to as conditioned variables, since they represent the consequence of reasoning. Symbolic variables that represent input conditions to the system shall be referred to as unconditioned variables. The parallel comparison of the binary words to predetermined patterns may be accomplished by software algorithm or specialized hardware.

The mathematical method comprises the use of tri-state variables to represent each binary bit in the inference rule words. The rule words are placed in a decision table as an aid to comprehension and assist in maintaining consistency between rules. The three states of each variable are "true" (or present), "false" (or absent), and "either". The number of system states covered by a rule can be readily determined from the number of variables in the rule represented by "either". The number of states covered is equal to two raised to a power equal to the number of "either" terms. To have a completely covered decision space, the total number of states covered by the rules must equal two raised to the power equal to the number of symbolic variables. For the rules to be unique (non-overlapping), each rule must differ from every other rule in at least one variable. That is, rules do not overlap if one of the symbolic variables is required to be "true" for one rule and "false" for the other rule. A consistent rule set will be defined as having no overlapping rules.

The method of building a complete and consistent rule base comprises identifying the symbolic variables that define the system states, setting up a rule with those variables each represented by "either", splitting the rule into other rules by replacing "either" values with "true" and "false" values such that each rule differs from every other rule in at least one symbolic variable, and maintaining the total number of states covered equal to two raised to the power equal to the number of symbolic variables.

The method of providing associative program control comprises building a rule base for program control, developing the program modules to be executed by each rule, initiating program execution by scanning the rule base for a rule that matches the current state (or executing a program module that terminates by scanning the rule base), executing the program module for that rule, and looping back to the rule scanning step.

A preferred arrangement for providing associative program control comprises storing the rule base in a content addressable memory (CAM) so that the rule scanning is done in parallel for very rapid execution. The programs executed by the rules are stored in standard memory. A preferred organization of the content addressable memory provides the flexibility to select blocks of rules of various sizes to be independently compared to the input data. A matched rule preferably delivers an address pointer to the memory location at which the program to be executed begins. In rewritable memories a comparator is preferably connected to each symbolic variable bit in each rule through a masking control to enable blocking the influence of bits in the rules that should have "either" values. A masking word is stored for each rule to control this blocking in addition to the storage of the rule word. In read-only-memories, preferably no connection is made from bit comparators of symbolic variables with "either" values, therefore no masking words need to be stored.

A preferred arrangement for providing associative database management comprises storing key words in content addressable memory which delivers address pointers to locations in standard memory where the bulk of the related data is stored. A preferred method eliminates the need to provide for multiple entries of key words in the content addressable memory by examining the content addressable memory for the word prior to storing it. If the word already exists in the memory, it is not stored again, but the related stored data is modified, if necessary, to reflect the new information.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 3 illustrates the use of a decision table to codify knowledge.

FIG. 5 shows how decision tables can guarantee unique rules.

FIG. 6 illustrates the use of tri-value variables.

DESCRIPTION OF THE PREFERRED EMBODIMENT

Figure 1:
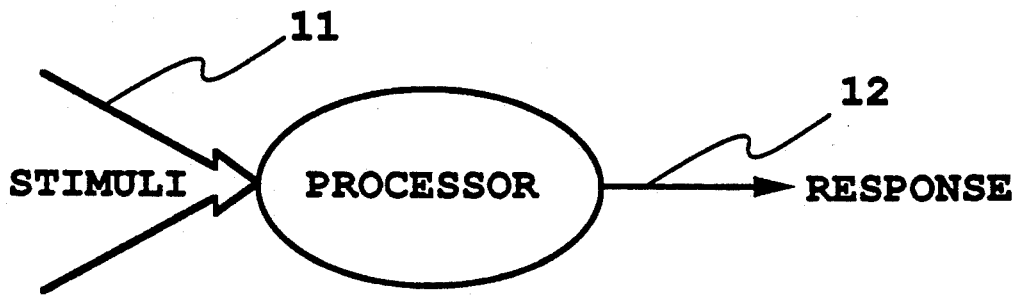
FIG. 1 shows a general representation of the application of associative program control to pattern recognition.

Real-time intelligent systems such as vision guided robots or sensor guided weapon systems and intelligent systems where time is not as critical can all be represented as in FIG. 1. The stimuli 11 are facts about the environment or conditions of interest for reaching a system goal. For time critical applications it is necessary to rapidly respond to inputs so that the system can keep apace. Being able to handle the inputs in parallel is one way to decrease the time to produce response 12. The current invention addresses this need.

Figure 2:
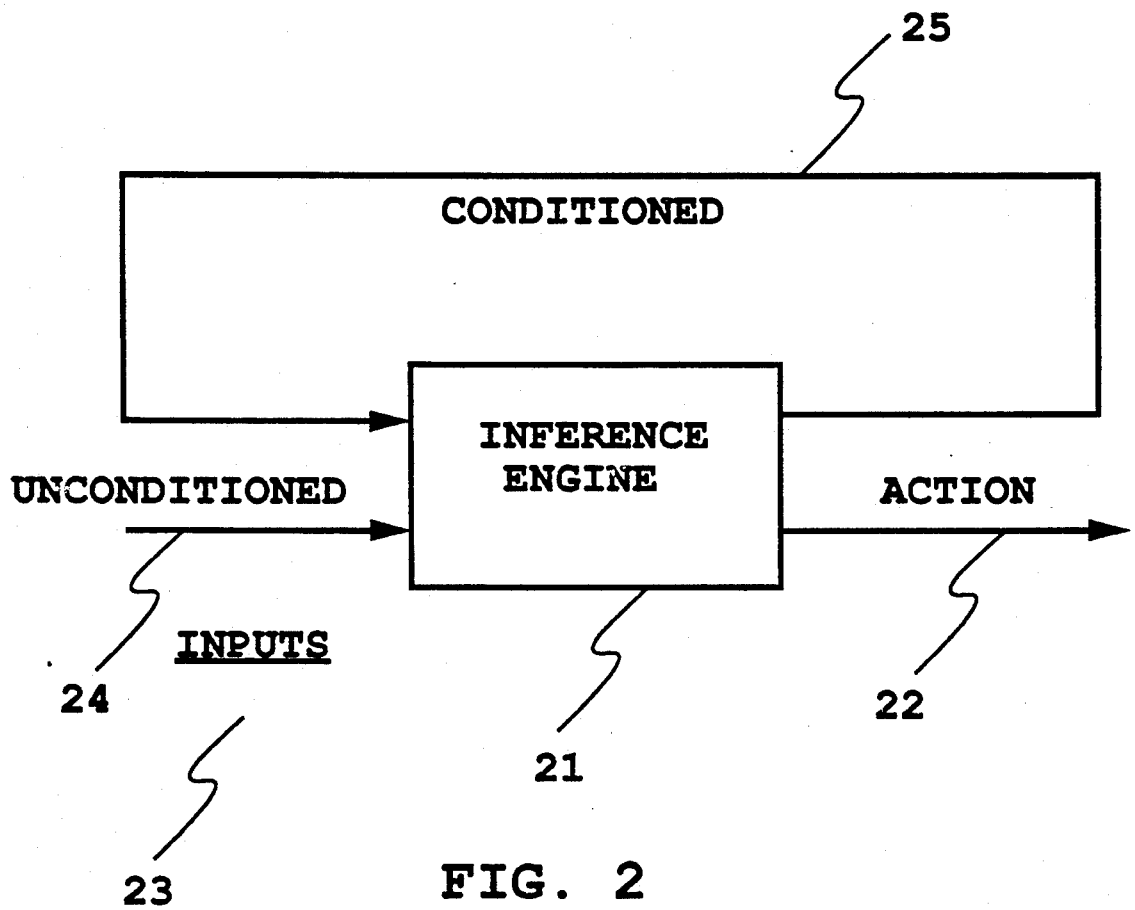
FIG. 2 shows a general representation of knowledge based systems.

Expert systems have become a well known way of embedding knowledge within a machine to provide intelligent control and expert advice. FIG. 2 shows a generalized representation of expert systems and how they capture knowledge. The inference engine 21 is composed of rules on what action 22 to order when a given set of inputs 23 are received. In order to adapt to changing conditions, rule set 21 also generates conditioned inputs 24 that are used together with unconditioned inputs 25 to infer appropriate action 22. Inputs 25 directly represent facts upon which systems decisions can be based and are therefore called "unconditioned". Inputs 24, however, represent facts indirectly derived from the unconditioned inputs 25, and are called "conditioned".

An example of an simple expert system is given in FIG. 3, in which four rules for granting a loan are shown in a decision table format 31. Rule 4 is also shown in word form 32. Three unconditioned input symbolic variables 33, 34, 35 are listed across the top of Table 31. Table 31 would accommodate more input variables, including conditioned variables, by adding column 36. Each row 37, 38, 39, 310 of Table 31 represents one rule. Table 31 would accommodate more rules by adding rows. Variables 33, 34, 35 can be "true", "false", or "either", which will be respectively represented by "1", "0", and "e".

Rule 1 in row 37 indicates that if variable 33 is "false", then a "no grant A" conclusion shall be given. The state of all other variables 34, 35, 36 are disregarded since the rule accepts "either" state for each. Likewise rule 2 in row 38 indicates that if variable 34 is "false", then a "no grant B" conclusion shall be given, and rule 3 in row 39 indicates that if variable 35 is "false", then a "no grant C" conclusion shall be given. As given in word form 32, rule 4 requires that three conditions must be met in order to grant a loan; the applicant's salary must be greater than $15,000, the credit rating must be good, and there must be references. Row 310 of Table 31 shows this rule.

Figure 4:
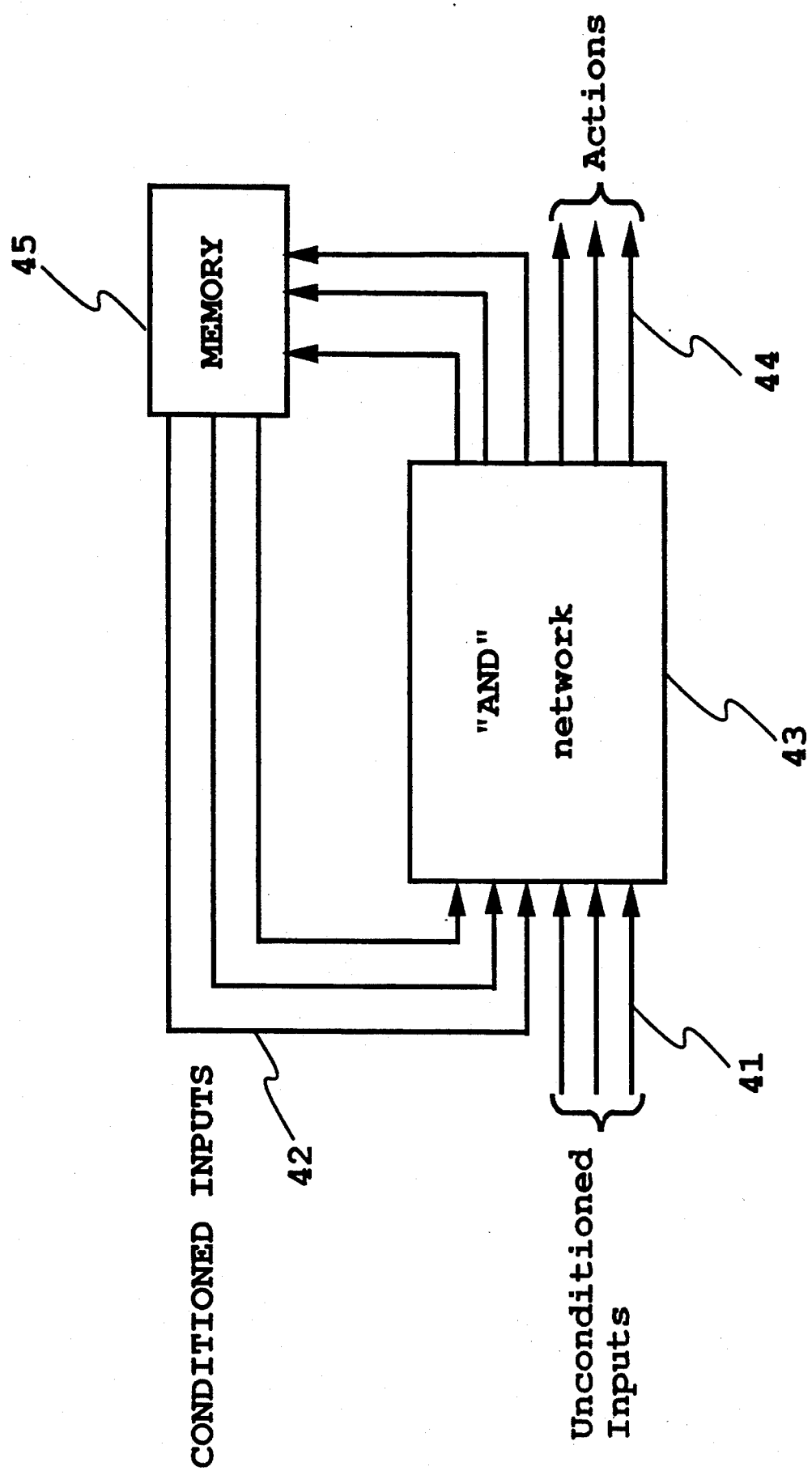
FIG. 4 illustrates the means of implementing a knowledge based system.

FIG. 4 shows how the decision Table 31 may be embodiment in a physical system. Unconditioned inputs 41 and conditioned inputs 42 are fed into an "and" network 43 in accord with the decision table rules. An "and" circuit is provided for each rule. When a pattern of symbolic variable values of a rule matches the input conditions 41, 42, its "and" circuit is enabled. This activates the rule's conclusion which is called the system's response or action 44. A rule's response may also include setting the state of a conditioned variable 42 in memory 45. The conditioned variable 42 may be used in any rule, including the rule that sets its state. In fact, to avoid a conflict between a rule that sets the conditioned variable 42 "true", and one that sets it "false", the variable 42 could be included in each rule with a value opposite to which it is set by the rule.

The decision table can be used to indicate conflicts between rules. Decision table 31 is reproduced in FIG. 5 as Table 51. Examination of rules 1, 2, 3 show that if all the "either" states are "false" (0), then all three rules would be satisfied or "fire" when the input conditions are all "false". The rules therefore represent overlapping states. It is preferred to have only one rule fire at a time; a consistent rule set. This can be accomplished by requiring each rule to differ from every other rule in at least one variable. Table 52 shows how the rule set of Table 51 can be modified to meet this criteria. In addition to requiring each rule to reflect a unique system state, the rule set should completely cover all possible system states so that no state will evoke an undetermined response.

FIG. 6 shows how we can mathematically guarantee a rule set that is complete and consistent. Decision Tables 51 and 52 are shown as Tables 61 and 62 respectively. The size of a decision space is determined by the number of variables and the number of states that they can occupy. For N binary variables, the number of unique combinations of variables is two raised to the Nth power. To prove completeness of a rule set involving N binary variables, therefore, we have to show that we cover that many states. If one variable does not affect a particular rule, then we can omit that variable from the rule or designate it as having the value "either". The rule then represents two states, one for each of the two possible states of the missing variable. Likewise, each additional variable that is omitted, doubles the coverage of the rule. In essence, each variable in our rules is tri-valued: 1, 0 and e. We need only to count the number of e's in a rule and raise two to that power, in order to know the number of states covered by a rule.

Row's 63, 64, 65 contain 4 e's each, and therefore each represent two raised to the fourth power states. Row 66 contains 2 e's and represents four states. Since the total number of columns in the decision table is 5, each column representing one binary variable, the total decision space is two raised to the fifth power or 32 states. Thus rows 63 and 64 together cover a number of states equal to the total possible states, which means that Table 61 covers too many states. There must be overlapping states in Table 61.

This can be corrected as shown in Table 62. The first rule, given in row 67, is left unchanged. The second rule, given in row 68, is changed to differ from row 67 in column 611; the e is changed to a 1. In like manner the third rule, given in row 69, is changed to differ from rows 67 and 68 by changing the e's in columns 611 and 612 to 1's. Row 610 differs in at least one column from each other row, and needs no correction. Rows 69 and 610 cover 4 states each for a total of eight states. Row 68 also covers 8 states, bringing the three rule total to 16. Row 67 covers 16 states, so the complete decision space of 32 is covered by these four rules.

In this simple example of the new methodology, just the variables represented by columns 611, 612, 613 were used, so columns 614 and 615 could be deleted. A complete and consistent rule set was developed for the three variables with just 4 rules even though 8 unique rules could be defined. In fact N+1 rules can always be written to cover the decision space of N variables. Usually more than the minimum number of rules are needed to describe desired system responses, but far less than the number of possible states.

The methodology can also reveal missing rules, which is one of the most difficult problems in developing a rule based system. If, for example, we knew just the rules of rows 67, 68, and 69. The methodology tells us that 28 of 32 rules are covered, so we know 4 more have to be covered. To differ from the first three rules, a 1 would have to appear in columns 611, 612, 613. Thus the missing rule is revealed. If the rule thus generated is deemed inappropriate, it serves as the base for splitting into appropriate rules with defined values in columns 614 and/or 615.

Figures 7, 8:
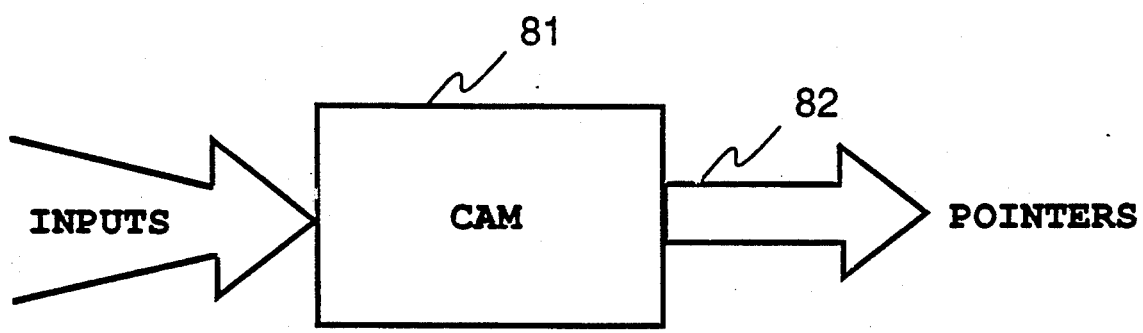
FIG. 7 shows the implementation of tri-valued variables.
FIG. 8 illustrates how content addressable memories can be applied to associative program control.

FIG. 7 illustrates how this methodology could be implemented with standard hardware available in today's computers. Two bits would have to be stored for each variable in each rule in order to represent the three possible variable states. A preferred method would encode the rule information in one computer word as shown on row 71 and encode validity information (mask) in another computer word as shown on row 72. The four rules of Table 62 are represented in the same order on rows 71, 73, 74, 75 with their associated masks below them. The rule 1's and 0's appear unchanged, and the e's are replaced by 0's. The validity bit is 1 for 1 or 0 in Table 62; the validity bit is 0 for each e.

To use the rule table in matching rules to input data to determine when a rule should fire, the input data is logically "anded" with the validity bits (the mask) which forces all variables, which should be disregarded, to zero. All input variable bits that are relevant, are unchanged by the mask. The rule is then subtracted from (compared to) the masked input data. A result of zero means the input data exactly matches the rule bit pattern, so the rule fires. Since many variables are being compared in parallel, a significant increase in processing speed can be obtained over the sequential testing of each variable in a rule. Also, since the rules don't overlap, no time consuming backtracking from a dead end logical reasoning branch is required.

The "either" rule bits don't have to be set to zero if the rule bits and input data bits are compared, giving a 0 when equal and 1 when unequal (bitwise exclusive or), and this result then "anded" with the validity bits. The rule fires if the result is zero.

A much faster response time can be obtained if a content addressable memory is used to store the rules and make the comparisons with input data. This is depicted symbolically in FIG. 8, analogous to FIG. 1. Currently AMD manufactures a chip, the Am99C10, than can provide some of this functionality. Although it provides a masking capability, it doesn't provide a separate mask storage for each word. The chip 81 reports the rule number 82 which can be used as an offset to an indirect addressing table for the desired responses. It would be preferable to provide the indirect addresses in a random access memory (RAM) on the CAM chip, in order to reduce the response time.

Figure 9:
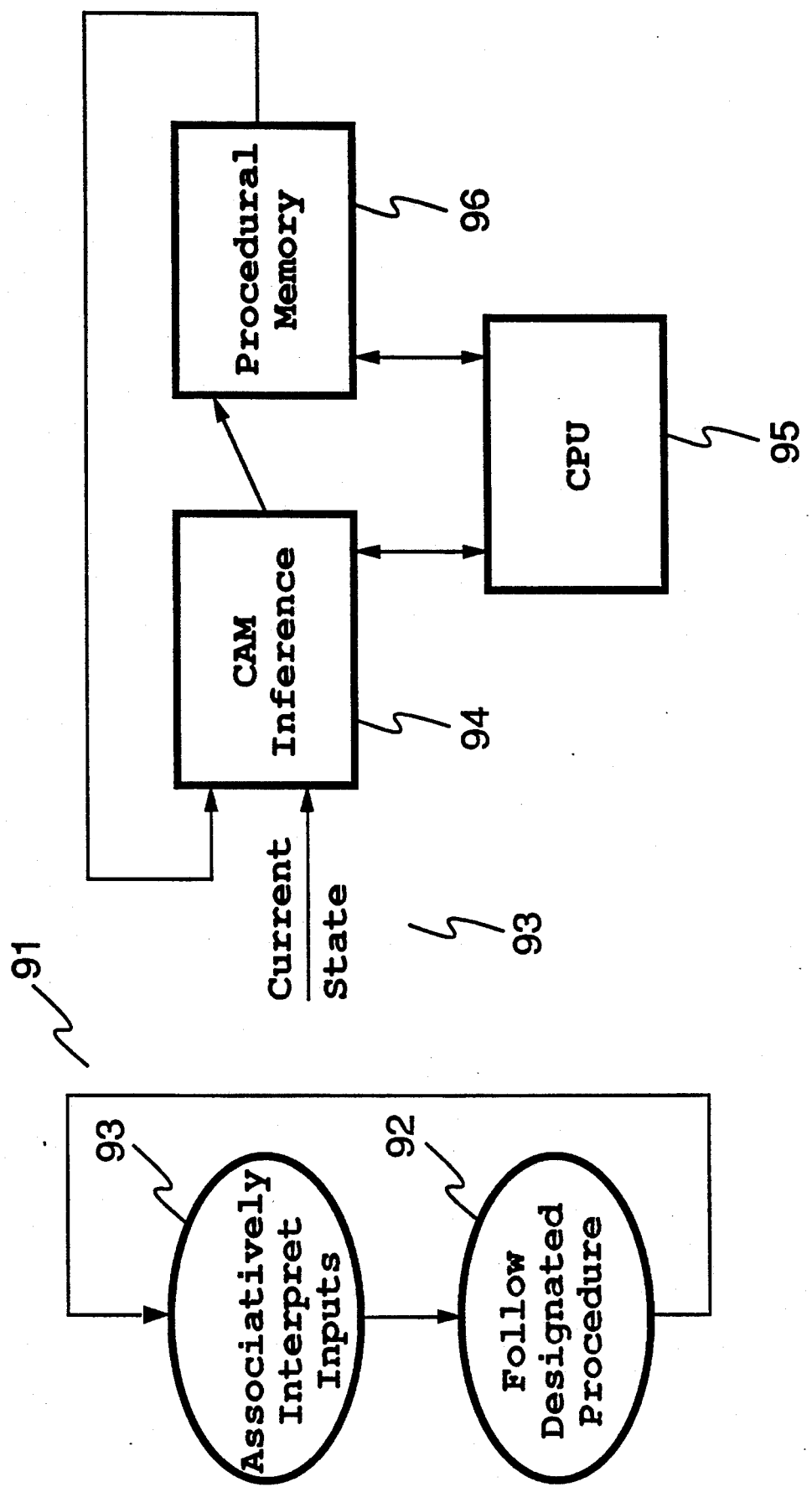
FIG. 9 shows a knowledge based system with associative program control.

The concept of associative program control is shown diagrammatically in FIG. 9. Program flow 91 shows that when a conventionally programmed procedure 92 completes, a procedure 93 to associatively interpret the inputs is invoked, rather than following a linear flow to the next procedure 92. In this way the system may continually respond to changing environmental input pattern in the manner of FIG. 1.

The preferred implementation of this concept is to store the program control rules in a CAM 94 which can infer which procedure should be invoked based on the current input state 93. Input state 93 consists of conditioned and unconditioned inputs in similar manner as given in FIG. 2. CAM 94 delivers a pointer to central processing unit (CPU) 95 that points to the procedure stored in Procedural Memory 96. CPU 95 then follows the instructions of the procedure in conventional memory 96 until the end of the procedure. CPU 95 then accepts the next inferred pointer from CAM 94 to repeat the process. The system continually adapts to the input state 93 in this manner.

Figure 10:
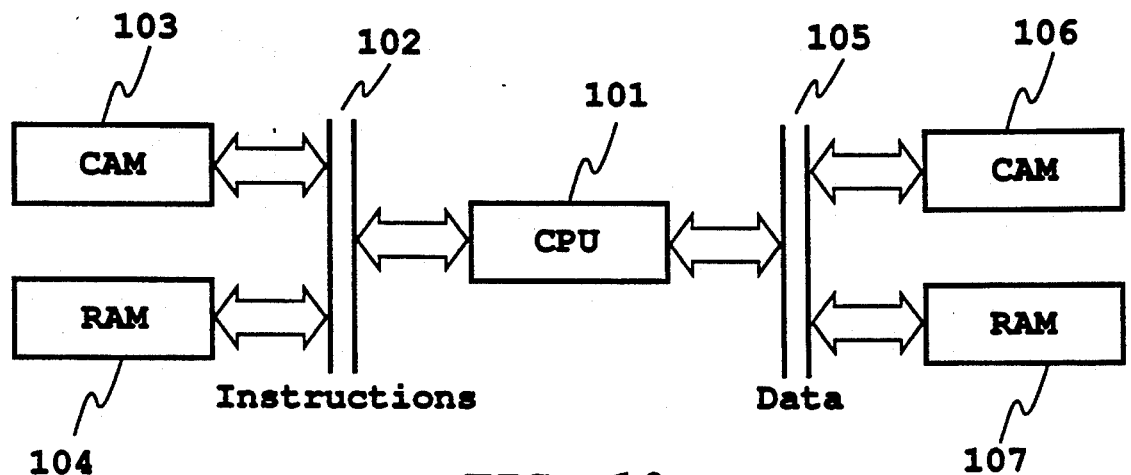
FIG. 10 shows a preferred computer architecture with associative program control and associative data base management.

FIG. 10 shows the concept implemented with a Harvard bus structure. CPU 101 sends the input state to CAM 103 via instruction bus 102. CAM 103 infers which procedure should be invoked and delivers its pointer to CPU 101 via bus 102. CPU 101 then starts to execute the procedure pointed to in RAM 104. Upon completion of the procedure, the cycle is repeated.

CPU 101 accesses data stored in RAM 107 via data bus 105. CAM 103 doesn't have to handle multiple occurrences of the same stored word because of the mutually exclusive rule construction of the new methodology. This allows using a simpler circuit within the CAM. The same simpler CAM circuitry can be used for CAM 106 to store key words to return pointers to related data in RAM 107, if duplicate key words are not stored. This can be assured by first presenting each new key word to CAM 106 to check if it matches any word already in the CAM. The new word would be stored only if no match is reported by CAM 106. If a match is reported, the new word would not be stored. However, if the application required the related data in RAM 107 to be modified, this would be done. No sorting, hashing or other scheme is required to store the keywords into CAM 106. No sequential search is required to retrieve a keyword. Thus database management is simplified and processing time reduced.

The new architecture of FIG. 10 is seen to be generally applicable to all processing. The ability of CAM's 103 and 106 to recognize patterns can greatly speed up applications needing that capability. Fast retrieval of objects based on matching attributes can be readily implemented. Database management has already been discussed as benefiting from the parallel search capability of a CAM. Interpretive languages can use the parallel search capability to reduce the time to match key word inputs. Intelligent control will benefit from the fast response time, large rule base capacity, and the well defined responses of rule based systems.

To reap the full benefits of semiconductor technology, the CAM should be made with very large capacity. Today's technology allows the construction of four megabit RAMs. Thirty-two bit data and instruction buses are being used in newer machines, and would provide powerful rules with 32 variables and a large addressing range. With a CAM storage cell complexity roughly four times that of a RAM cell, a CAM could be constructed that would contain storage for 32,768 rule words, validity words, and address words. However, it would be unusual to have applications that would use only 32 variables and needing that many rules.

In general the decision space is sparsely populated. A typical application used only 34 rules out of the whole space of 131,072 possible combinations of its 17 variables. For this reason the CAM should incorporate a decoding means, such as described in the following paragraphs for multiplexing the input variables in order to provide for many sets of variables. Each variable set would have its own set of applicable rules that could be activated when its set of variables appeared on the data lines to be matched.

Figure 11:
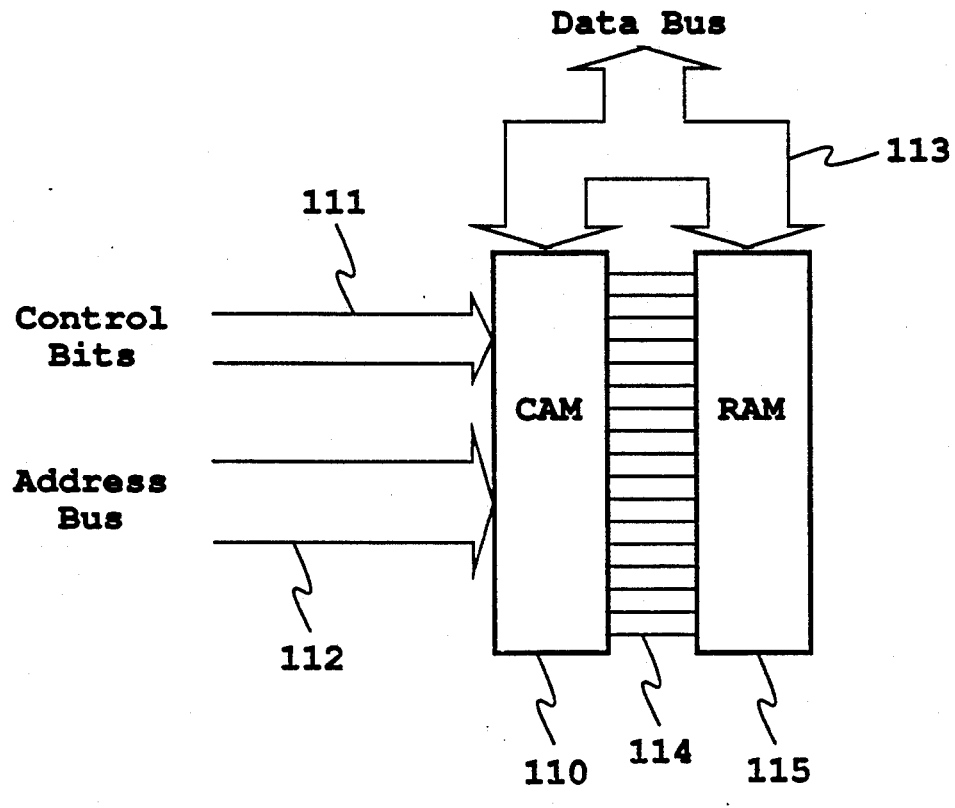
FIG. 11 shows the preferred content addressable memory implementation.

This concept is diagramed in FIG. 11 where CAM 110 is partitioned into sets of rules via control bits 111 and address bits 112. CAM 110 and RAM 115 would reside on a single semiconductor chip. Three of seven control bits 111 would designate operational modes, such as programming the CAM 110 with rules and validity words, programming the RAM 115 with action addresses, placing the chip into its rule matching mode, and reading out the action address of a matched rule. The other 4 of 7 control bits 111 would select group size. Control bits 111 could be part of an addressing word containing address bits 112.

The number of control bits for group size selection is based on how many group sizes can be defined. For simplicity, group sizes would be selected in binary steps from 1 up to some maximum value. This necessitates 4 bits for 32,768 rules, to provide 16 group sizes, from 1 rule up to the entire array in binary increments.

Alternatively the 16 group sizes could be encoded into the 15 address bits plus one control bit. When the control bit is zero, the group size would be designated as one and the 15 address bits 112 would identify 32,768 unique addresses. When the control bit is a one, and the lower 14 address bits are all one, the group size would be designated as 32,768, the whole array. When the control bit is a one, the 14th bit is zero, and the lower 13 address bits are all one; the group size would be designated as 16,384 and the highest address bit would select the upper or lower half of the array, depending on its state of one or zero respectively. When the control bit is a one, the 13th bit is zero, and the lower 12 address bits are all one; the group size would be designated as 8,192 and the highest two address bits would select one of four quarters of the array, depending on their four possible state combinations. Continuing in this manner, the group size is designated half as large for each lower bit position that contains the first zero, until bit 1, the lowest bit, is zero; in which case the upper 14 address bits would select one of 16,384 groups of two rules each.

In the mode to program rule words into CAM 110, address bits 112 (15 bits for 32,768 rules) would select the rule to be programmed and the rule bit pattern would be applied to the chip via data path 113. CAM 110 would store the applied data pattern in the designated rule location.

In the mode to program validity words into CAM 110, address bits 112 would select the rule to be programmed and the validity bit pattern would be applied to the chip via data path 113. CAM 110 would store the applied data pattern in the designated rule validity data location.

In the mode to program action address words into RAM 115, address bits 112 would select the rule to be programmed and the action address bit pattern would be applied to the chip via data path 113, RAM 115 would store the applied data pattern in the designated rule action address data location. Preferably, to minimize complexity, the same address bit pattern would be used for the rule, validity and action address word storage for each rule, just the mode control bits would be different. In use, however, the 4 group size control bits (or alternative encoded bit pattern) could be set to select for the group size over which a common validity bit pattern applied. This would enable all rule locations in the whole group or subgroup to be programmed with the common validity word at one time.

In the rule matching mode, the 4 group size control bits 111 and 15 address bits 112 (or alternative encoded bit pattern) would be set to select the group of rules applicable for the current input data bits 113. CAM 110 would mask out the "don't care" bits of the input word 113 using the validity word associated with each rule. If the rules are developed with the methodology outlined above, then one, and only one, rule will match the input data 113. Each rule in CAM 110 is coupled via a wire 114 to it's corresponding action address in RAM 115 to enable its readout. The enable signal would be latched for later readout.

In the action address readout mode, the 4 group size control bits 111 and 15 address bits 112 (or alternative encoded bit pattern) would remain the same as in the rule matching mode just preceding the readout. The action address enabled by the matched rule would be placed on the data bus 113. At the conclusion of the readout mode, the enabling latch would be reset.

Figure 12A:
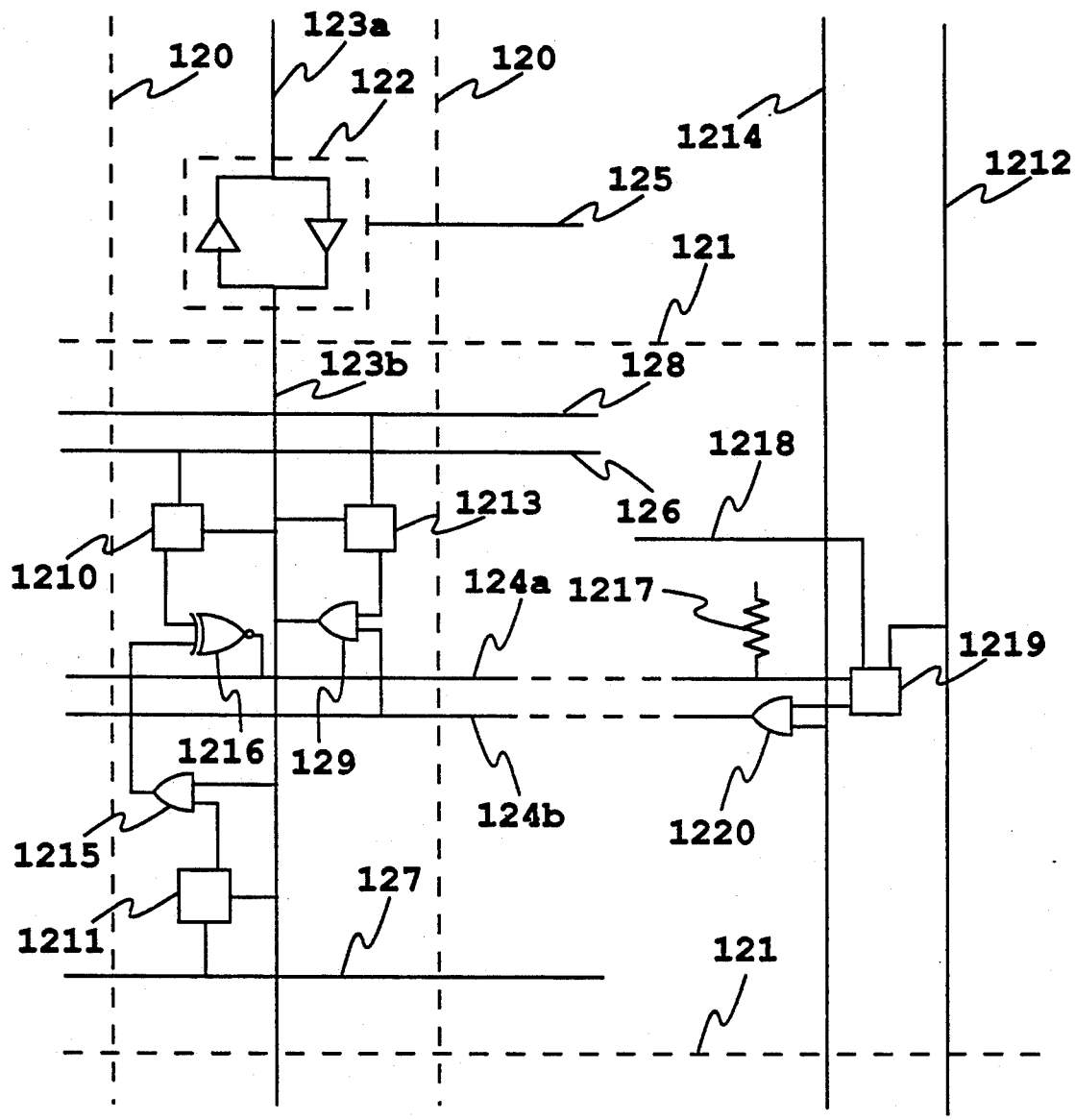
FIGS. 12a-12c show schematically the preferred content addressable memory implementation.

A detailed schematic of a rule with its associated action address to implement the chip shown in FIG. 11 is given in FIG. 12a. All the circuitry shown between vertical dashed lines 120 (FIG. 12a) is repeated horizontally in vertical columns for each data bit of data bus 113 (FIG. 11). All the circuitry shown between horizontal dashed lines 121 (FIG. 12a) is repeated vertically in horizontal rows for each rule.

Data bit line 123a brings the input signal to a bidirectional buffer 122 whose direction of transmission is controlled by the logic level of R/W line 125 generated by conventional decoding (not shown) of control bits. In the three modes for storing data, signals on line 123a pass through buffer 122 to line 123b. Line 123b brings the signal to each rule bit storage cell represented by the area between lines 120 and 121. When storing the rule bit, the logic level is set to a 1 on line 126 of the rule selected by conventional decoding (not shown) of control and address bits (111 and 112 in FIG. 11). Similarly, line 127 is set to a 1 when storing a valid bit and line 128 is set to a 1 when storing an action address bit.

When line 126 is set to a 1, storage element 1210 is enabled to store the signal level on line 123b. Similarly the valid bit logic level is stored in element 1211 and the action address bit logic level is stored in element 1213. Lines 126, 127, 128 are logic 0 when not storing new values in their storage elements.

AND gate 1215 passes the logic level of line 123b to EXCLUSIVE NOR gate 1216 when the stored valid bit logic level is 1, otherwise gate 1215 presents a 0 to gate 1216. Gate 1216 forces a 0 on line 124a if the rule bit logic level stored in element 1210 does not match the level presented by gate 1215. Line 124a with pull up resistor 1217 forms a "WIRED AND" with gate 1216 and the corresponding gates in each of the other data bit columns (a conventional ANDing of all the data bit gate outputs could be used instead).

When in the rule matching mode, the logic level is set to a 1 on line(s) 1218 of the rule group selected by conventional decoding (not shown) of control and address bits (111 and 112 in FIG. 11). Line(s) 1218 is (are) otherwise set to 0. When line 1218 is set to 1, storage element 1219 is enabled to store the logic level of line 124a. One line 124a of the selected group will be at the logic 1 level if the methodology described above is followed.

When in the action address readout mode, the logic level is set to a 1 on line 1214 generated by conventional decoding (not shown) of control bits. Line 1214 is otherwise set to 0. When line 1214 is set to 1, the level stored in storage element 1219 passes through AND gate 1220 to line 124b (referred to as an enable signal on line 114 of FIG. 11). If latch reset line 1212 is activated prior to the rule matching mode, then only one element 1219 will contain a 1 to force its line 124b to a 1 level. The line 124b that is at a 1 level will enable the logic level stored in element 1213 of each rule bit storage cell to be passed to its corresponding data line 123b via its AND gate 129. The level on line 123b passes through bidirectional buffer 122, controlled by R/W line 125, to data bit line 123a. The action address is thus placed on the data lines (113 of FIG. 11). Reset line 1212 can be activated at the end of the readout mode. Reset line 1212 is not required if element 1219 is a D-type flip-flop.

Figure 12B:
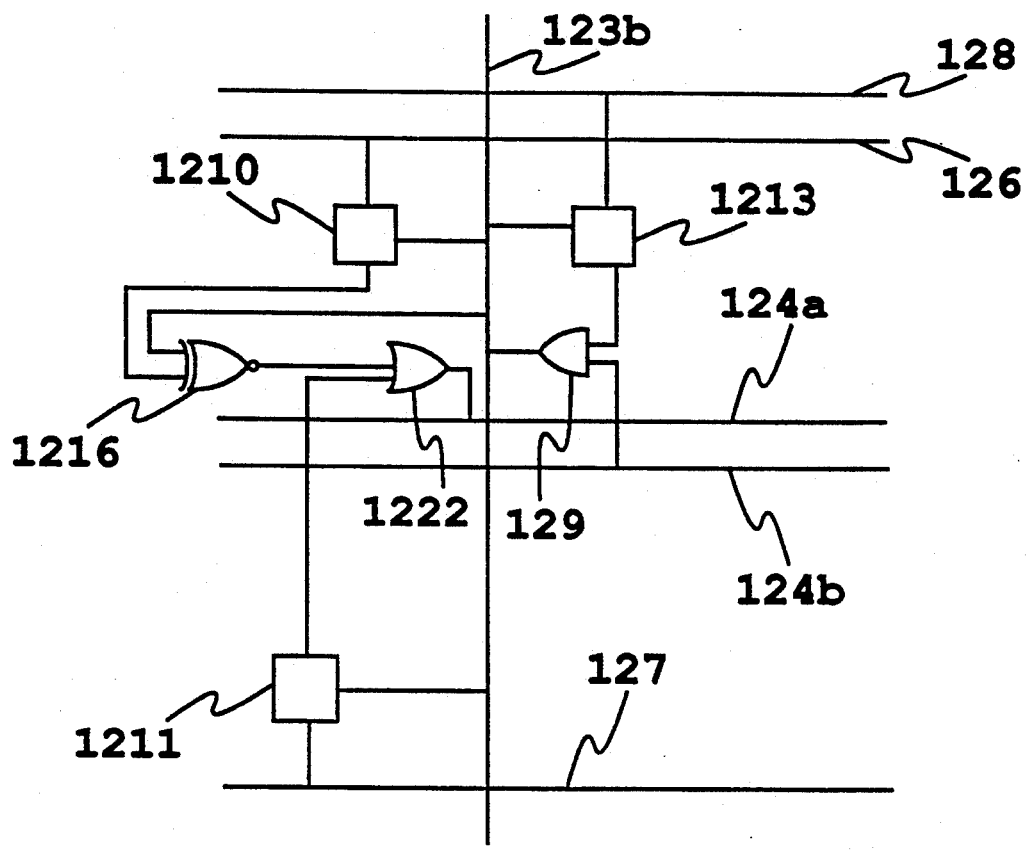

FIG. 12b shows an alternative way to implement the logic to produce a 1 on line 124a that avoids the need to store 0's for "don't care" rule bits. Signals on line 123b connect directly to EXCLUSIVE NOR element 1216 to produce a 1 when the rule bit logic level stored in element 1210 matches that on line 123b. The output of element 1216 and the output of valid bit logic level storage 1211 are connected to OR gate 1222 which forms a "WIRED AND" with other cells in the row via line 124a. The valid logic bit level has to be a 0 to enable the output of element 1216 to appear on line 124a. This is the inverse of the valid logic bit level used in FIG. 12a. The inversion can be done in storage element 1211 or by receiving the inverse on line 123b.

Figure 12C:
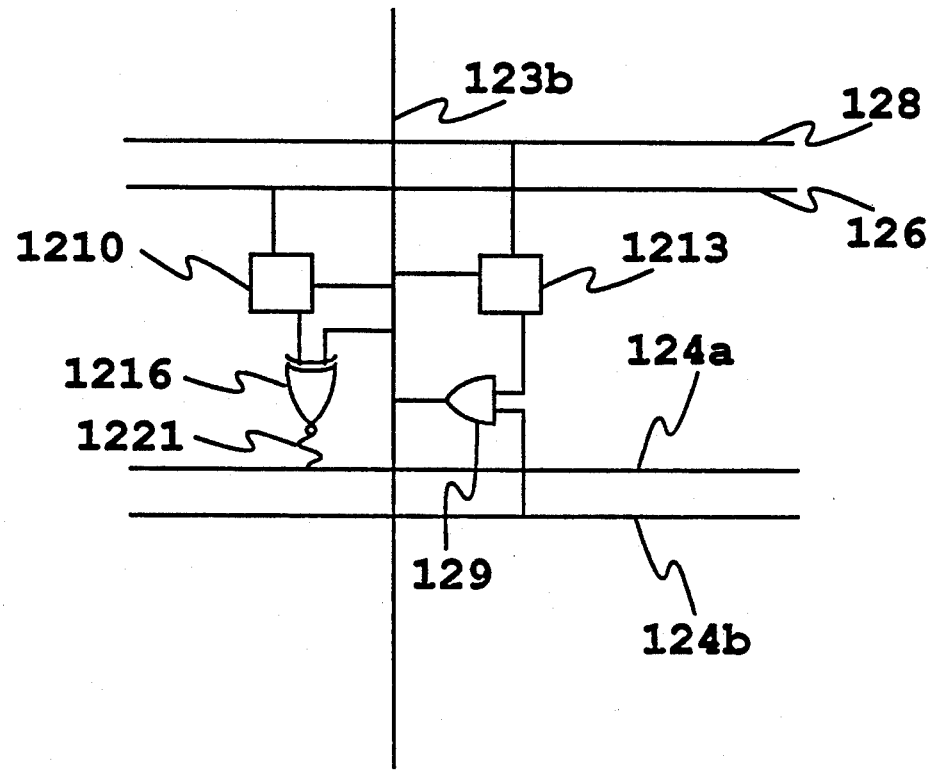

FIG. 12c shows how the rule bit storage cell can be simplified in programmed CAM's using PROM technology (PCAM). Validity bit storage element 1211, line 127, and gate 1215 are not required to block "don't care" rule bits stored in elements 1210. Data line 123b is connected directly to one input of EXCLUSIVE NOR gate 1216. Connection 1221 just needs to be removed for each "don't care" bit when the chip is programmed. For mask programmed CAM's using ROM technology (MCAM), element 1210 and gate 1216 can also be eliminated.

The roles of lines 1218 to select the rule group to be enabled for storage and line 1214 to enable readout of the stored match level can be reversed to achieve the same end result in each configuration.

The new CAM design shown in FIGS. 11 and 12 can be used for some programmable array logic (PAL) applications. The design provides for the mapping of many 32 bit input data patterns to 32 bit address or control patterns. The group selection capability allows redefining the definition of the input variables so that more than 32 input variables can be represented at varying times.

The present invention has been described and illustrated with reference to an exemplary embodiment. It is not to be considered limited thereto, inasmuch as all modifications and variations which night offer themselves, are intended to be encompassed within the scope of the appended claims.

What is claimed is:

1. A method for rapidly processing expert system rules in computing machinery comprising the steps of:
   a. determining all conditions that define knowledge within a domain boundary, said conditions defined by n different binary valued variables;
   b. numbering said variables sequentially 1 through n;
   c. for each said condition: defining a rule word and an associated validity word, said rule word and said validity word containing bits numbered sequentially 1 through n;

d. defining a data word containing bits numbered sequentially 1 through n;

e. in all said words: assigning said bits numbered 1 through n to represent said variables of corresponding number;

f. for each said rule word: defining a value for said rule word by assigning a 1 to a bit in said rule word if the variable said bit represents is true or present in the condition said rule word represents, assigning a 0 to said bit otherwise;

g. for each said rule word: defining a value for said associated validity word by assigning a 1 to a bit in said validity word if the variable said bit represents has an effect in the condition said rule word represents, assigning a 0 to said bit otherwise;

h. defining a value for said data word by assigning a 1 to a bit in said data word if the variable said bit represents is true or present, assigning a 0 to said bit otherwise;

i. storing said rule words and said associated validity words in a content addressable memory (CAM), said CAM performing the steps of:
  1. logically ANDing said data word with each said validity word, forming masked data words; and
  2. declaring a match when one of said masked data words and the rule word associated with the validity word forming said one of said masked data words are equal; and j. applying said data word to said CAM, said CAM reporting said rule word for which said match is declared.

2. A method as defined in claim 1, wherein step (i) is replaced by:
  i. storing said rule words and said associated validity words in a content addressable memory (CAM), said CAM performing the steps of: forming a comparison word for each said rule word, bits of said comparison word being set to 1 when corresponding bits of said data word and said rule word are equal; logically ORing said comparison word with the logical inverse of said stored validity word associated with said rule word; and declaring a match when the result of said ORing is a one for each said bit.

3. A method as defined in claim 1, wherein steps (i) through (j) are replaced by:
  i. for each said rule word: defining an associated reporting word and assigning a value to said reporting word;
  j. storing said rule words, said associated validity words, and said associated reporting words in a content addressable memory (CAM), said CAM performing the steps of:
    1. logically ANDing said data word with each said validity word, forming masked data words; and
    2. declaring a match when one of said masked data words and the rule word associated with the validity word forming said one of said masked data words are equal; and
  k. applying said data word to said CAM, said CAM reporting said reporting word associated with said rule word for which said match is declared.

4. A method as defined in claim 1 wherein the step of storing said rule words and said associated validity words is followed by a by a step of selecting a group of said rule words and associated validity words stored in said CAM, forming a selected group; and said ANDing step and said declaring step are restricted to said selected group.

5. A method as defined in claim 1, wherein steps (i) through (j) are replaced by:
  i. storing said rule words in a programmable content addressable memory (PCAM);
  j. disabling each bit of each said rule word stored in said PCAM if the corresponding bit in said associated validity word is a 0, the remaining bits of said rule word being enabled; and
  k. applying said data word to said PCAM, said PCAM reporting said rule word whose enabled bits are equal to corresponding bits in said data word.

6. A method as defined in claim 5 wherein the step of storing said rule words is followed by a by a step of selecting a group of said rule words stored in said PCAM, forming a selected group; and in said applying step the reporting by said PCAM is restricted to said selected group by said PCAM.

7. A method as defined in claim 1, wherein steps (i) through (j) are replaced by:
  i. storing said rule words in a maskable content addressable memory (MCAM);
  j. disabling each bit of each said rule word stored in said MCAM if the corresponding bit in said associated validity word is a 0, the remaining bits of said rule word being enabled; and
  k. applying said data word to said MCAM, said MCAM reporting said rule word whose enabled bits are equal to corresponding bits in said data word.

8. A method as defined in claim 7 wherein the step of storing said rule words is followed by a by a step of selecting a group of said rule words stored in said MCAM, forming a selected group; and in said applying step the reporting by said MCAM is restricted to said selected group by said MCAM.

9. A method as defined in claim 1, wherein steps (i) through (j) are replaced by:
  i. for each said rule word: defining an associated reporting word and assigning a value to said reporting word;
  j. storing said rule words and said associated reporting words in a programmable content addressable memory (PCAM) with each bit of each said rule word stored in said PCAM enabled if the corresponding bit in said associated validity word is a 1, otherwise said bit is disabled; and
  k. applying said data word to said PCAM, said PCAM reporting said reporting word associated with said rule word whose enabled bits are equal to corresponding bits in said data word.

10. A method as defined in claim 1, wherein steps (i) through (j) are replaced by:
  i. for each said rule word: defining an associated reporting word and assigning a value to said reporting word;
  j. storing said rule words and said associated reporting words in a maskable content addressable memory (MCAM) with each bit of each said rule word stored in said MCAM enabled if the corresponding bit in said associated validity word is a 1, otherwise said bit is disabled; and
  k. applying said data word to said MCAM, said MCAM reporting said reporting word associated with said rule word whose enabled bits are equal to corresponding bits in said data word.

11. A rule based expert system comprising:
rule memory means for storing rules, each said rule composed of bits, each said bit representing one state of a binary valued condition variable;
mask memory means for storing masks, one said mask associated with each said rule, each said mask comprising binary indicators, one said indicator for each said bit of said rule;
rule applying means for reporting a matching rule when all bits of a data word coupled to said rule applying means equal the corresponding bits of said matching rule, said matching rule being one of said rules stored in said rule memory means; and
rule masking means for coupling said data word, wherein for each said mask associated with each said rule, each said indicator stored in said mask couples a different said bit of said data word to said rule applying means when said indicator is in one given state, said bit of said data word is not coupled when said indicator is in a second state.

12. A rule based expert system as defined in claim 11 wherein said rule applying means and rule masking means are replaced by:
rule applying means for recording a "match" state for each said bit of said rules stored in said rule memory means for which said bit equals the state of a corresponding bit of a data word, recording a "no match" state for each said bit of said rules for which said bit does not equal the state of a corresponding bit of said data word; and
rule masking means for reporting a matching rule when no bits of said matching rule are recorded "no match" by said rule applying means for which the corresponding indicator stored in said mask memory means is in a given state, said matching rule being one of said rules stored in said rule memory means.

13. A rule based expert system as defined in claim 12 wherein said rule memory means, said mask memory means, said rule applying means, and said rule masking means comprises a content addressable memory (CAM).

14. A rule based expert system as defined in claim 11 wherein said rule memory means, said mask memory means, said rule applying means, and said rule masking means comprises a content addressable memory (CAM).

15. A rule based expert system as defined in claim 14 wherein said rule applying means comprises further single step control means for selecting a group of said rules stored in said rule memory means and associated said masks stored in said mask memory means; and means for restricting said rule applying means to reporting a matching rule within said group selected.

16. A rule based expert system as defined in claim 14 wherein said CAM reports a reporting word associated with said matching rule in place of said matching rule and said CAM further includes:
reporting word storage means for storing said reporting word, at least one said reporting word associated with each said stored rule.

17. A rule based expert system comprising a programmable content addressable memory (PCAM) containing:
rule memory means for storing rules, each said rule composed of bits, each said bit representing one state of a binary valued condition variable;
rule applying means for reporting a matching rule when all selected bits of a data word applied to said rule applying means equal the corresponding bits of said matching rule, said matching rule being one of said rules stored in said rule memory means; and
rule masking means for selecting said selected bits applied to said rule applying means, each said rule having an independent set of said selected bits.

18. A rule based expert system as defined in claim 17 wherein said rule applying means comprises further single step control means for selecting a group of said rules stored in said rule memory means; and means for restricting said rule applying means to reporting a matching rule within said group selected.

19. A rule based expert system as defined in claim 17 wherein said PCAM reports a reporting word associated with said matching rule in place of said matching rule and said PCAM further includes:
reporting word storage means for storing said reporting word, at least one said reporting word associated with each said stored rule.

20. A rule based expert system comprising a maskable content addressable memory (MCAM) containing:
rule memory means for storing rules, each said rule composed of bits, each said bit representing one state of a binary valued condition variable;
rule applying means for reporting a matching rule when all selected bits of a data word applied to said rule applying means equal the corresponding bits of said matching rule, said matching rule being one of said rules stored in said rule memory means; and
rule masking means for selecting said selected bits applied to said rule applying means, each said rule having an independent set of said selected bits.

21. A rule based expert system as defined in claim 20 wherein said rule applying means comprises further single step control means for selecting a group of said rules stored in said rule memory means; and means for restricting said rule applying means to reporting a matching rule within said group selected.

22. A rule based expert system as defined in claim 20 wherein said MCAM reports a reporting word associated with said matching rule in place of said matching rule and said MCAM further includes:
reporting word storage means for storing said reporting word, at least one said reporting word associated with each said stored rule.

* * * * *